Dec. 19, 1967     EISUKE FUJIMOTO     3,359,439
ELECTRIC MOTOR
Filed Aug. 23, 1965     2 Sheets-Sheet 2
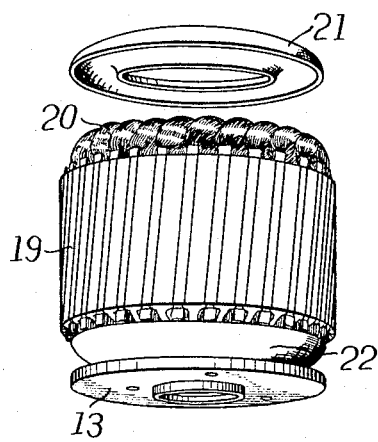
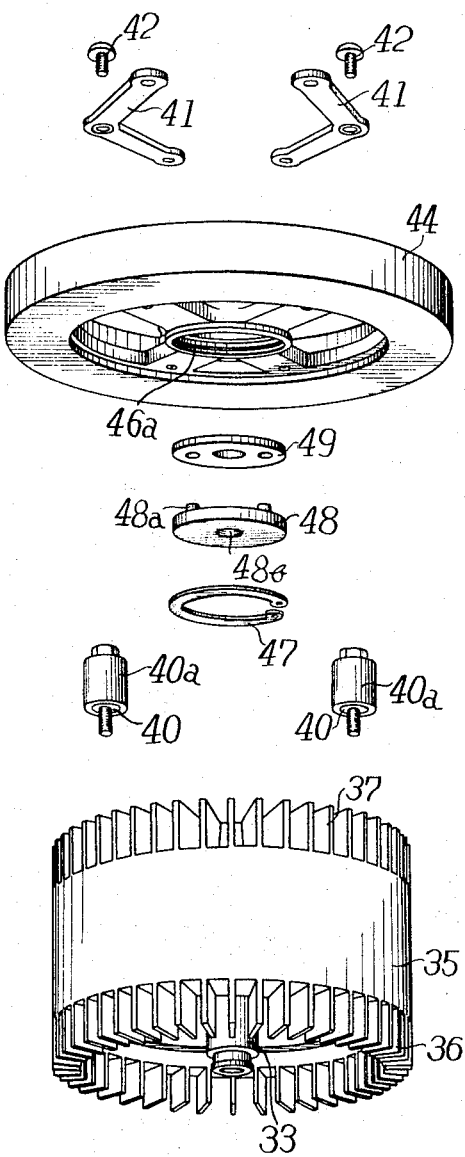
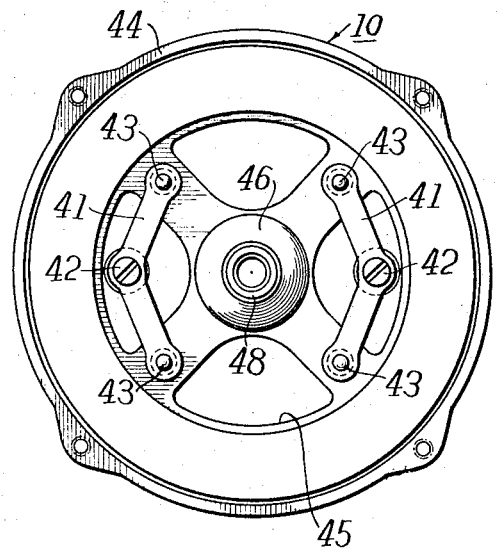
INVENTOR.
EISUKE FUJIMOTO
BY KARL RATH
ATTORNEY United States Patent Office 3,359,439
Patented Dec. 19, 1967

3,359,439
ELECTRIC MOTOR
Eisuke Fujimoto, Tokyo, Japan, assignor to Akai Electric Company, Limited, Tokyo, Japan
Filed Aug. 23, 1965, Ser. No. 481,599
6 Claims. (Cl. 310—74)

This invention relates generally to electric motors. More specifically it relates to an electric motor adapted to drive the capstan shaft of magnetic tape recording and playback machines so as to feed magnetic tape at a constant speed as possible.

It is commonly known to those skilled in the art that even if an electric motor be designed according to the highly advanced modern techniques, the development of unbalanced shocking torque is unavoidable, especially at the starting moment of the motor. Further, fluctuations of rotational speed of the motor will be frequently encountered, especially for a short period upon starting of the motor.

When the motor is fitted in a magnetic tape recording and playback machine, the above-mentioned undesirable effects should be damped and balanced out as possible, for establishing a substantially constant speed of tape drive.

The main object of the present invention is to provide an electric motor, either for A.C. or D.C. use, which is highly balanced mechanically and has a predominantly elastic damping characteristic for well absorbing possible unbalanced torque developed in the motor.

A further object of the invention is to provide an electric motor of the kind above referred to, which has a larger flywheel effect in a compact design so as to provide as constant rotational speed as possible.

A further object of the invention is to provide an electric motor well lubricated so as to provide and assure as constant rotational speed as possible for a long extended use of the motor.

A further object of the present invention is to provide an electric motor which is capable of supporting axial thrust in both axial directions of the rotor so as to meet with occasional circumstances wherein the motor is positioned upside down for some reason.

A still further object of the invention is to provide an electric motor which is well air-cooled for avoiding undue thermal load which may affect the desired constant speed characteristics of the motor.

These and further objects, advantages and features of the invention are set forth in the following detailed description of the invention with reference to the accompanying drawings, wherein a preferred embodiment of the invention is illustrated in non-limiting sense of the invention.

In the drawings:

FIG. 2 is a top plan view of a flywheel and a motor housing employed in the motor, with the detachable motor housing cover removed;

FIG. 3 is a perspective and exploded view of the stator assembly; and

FIG. 4 is an exploded perspective view of the rotor and flywheel assembly employed in the invention.

Figure 1:
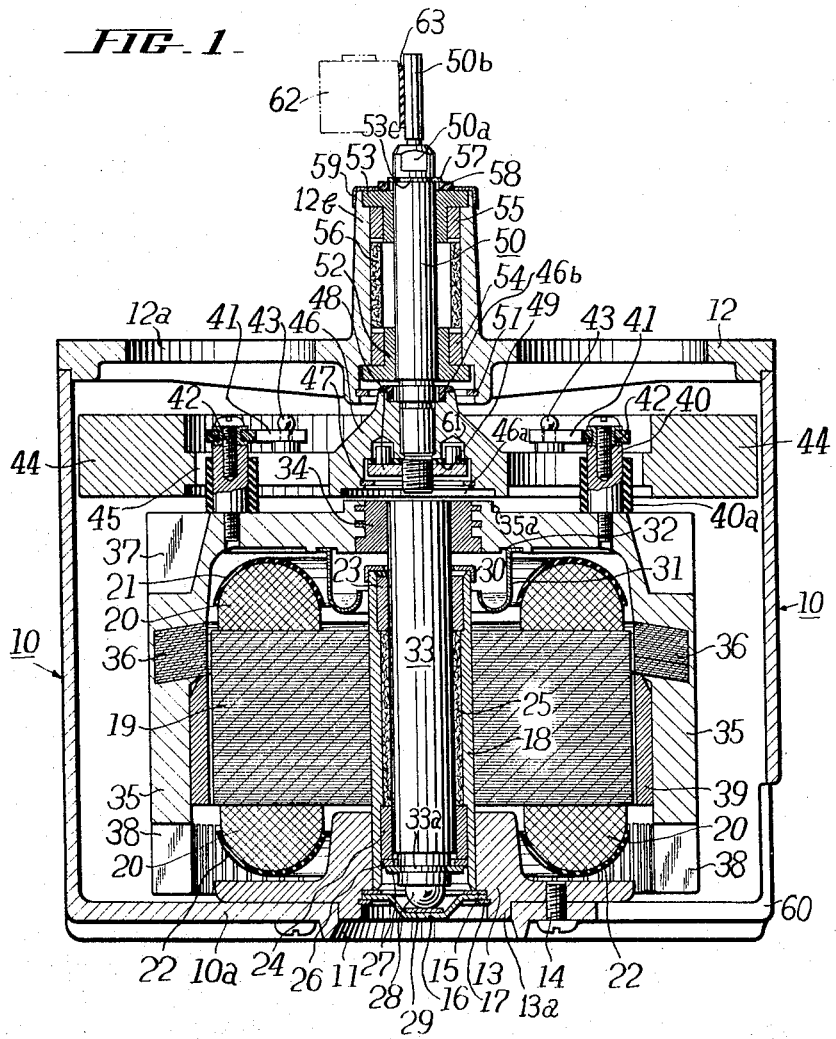
FIG. 1 is a logitudinal section of an electric motor embodying the principles of the present invention.

Now referring to the accompanying drawings, 10 denotes a cup-shaped housing which is formed with a central opening 11 bored through the bottom wall 10a of the housing. A detachable cover 12 is provided as shown in FIG. 1 for closing the upper opening of the housing 10 by means of a plurality of fixing screws not shown. The housing 10 and the cover 12 are both made of a light-alloy, preferably by die-casting. A flanged and bored mounting piece 13 is inserted with its lower cylindrical projection 13a fitted into the bore 11 with a slight play and detachably, yet rigidly fixed to the bottom wall, by means of a plurality of fixing screws 14.

At the lower part of the bore of the piece 13, a spring clip 15, a dished thrust bearing member 16 and a further spring clip 17 are fitted from bottom successively to the piece. A stationary sleeve 18 is inserted into the bore of the piece 13, until it abuts against the upper spring clip 15, said sleeve being fitted rigidly at its central region with a stack of stator laminates 19 which is in turn wound with stator coil 20. The coil 20 is capped with an upper plastic and resilient cover 21 having the shape of a half doughnut. In a similar way, the coil 20 is protected at its lower projecting end by a half-doughnut ring cap 22 press-fit thereon and kept frictionally in position.

A vertical rotor shaft 33 is rotatably supported at its lowermost end through the intermediary of a steel ball 28 and a nylon disc 29 by the stationary thrust member 16, said shaft being kept in a concentric relative position with the internal wall surface of the sleeve 18 by upper and lower bearings 23 and 24, preferably of the porous and oilless nature. For better positioning of these bearings, the sleeve 18 is formed with corresponding receiving shoulders on its internal wall surfaces as shown. For preventing the lower bearing 24 from slipping out of position, the bearing is supported through a nylon ring 26 by a spring clip 27 which is detachably received in a circular groove 33a formed on the reduced lower end of the shaft 33. In a ring space defined between the opposing end surfaces of the both bearing metals 23-24, on the one hand, and between the reduced inside wall surface of the sleeve 18 and the outer peripheral surface of the shaft 33, on the other hand, a mass of fibrous and absorbing material 25, such as a sheet of felt, is filled for keeping therein a quantity of lubricant, as will be described more fully hereinafter.

An iron ring piece 34 is cast integrally with an outer rotor 35, having substantially the shape of an inverted cup, and press-fit onto the uppermost end of the shaft 33. A laminated rotor core 36 is cast in the cylindrical wall of the rotor for cooperating dynamically with the inner stator arrangement. For assisting this effect, an iron sleeve 39 is slid from below onto the inside wall surface of the said inverted cup in the area below the rotor core 36.

The upper and lower peripheral edges of the rotor are transformed into respective rows of cooling vanes 37 and 38 for the realization of better air cooling when the motor runs, which construction can be most clearly seen by an observation of the lowermost part of FIG. 4. A plurality of separated air outlet openings 60 are formed through the lower part of housing 10, only one of which is seen in FIG. 1.

A nylon cap 30 is tightly fitted onto the uppermost end of the sleeve 18 and encloses the rotor shaft 33 with slight play for preventing foreign particles from invading the bearing space for the shaft 33, yet allowing the lubricant to pass through the fine gap between the closing cap 30 and the shaft into the bearing space. A ring groove 32 is formed on the lower surface of the web part of the rotor around its rotational center and an oil receiver 31 is inserted with the upper end into the groove and held firmly in position such as by sticking.

A plurality of separated pins 40, herein two, are studded axially on the web of the rotor and a rubber sleeve 40a is fitted on each of these pins so as to cover substantially the outside surface thereof for the realization of effective cushioning effect at the starting moment of the motor, as will be more fully described hereinafter.

A resilient connecting strip 41 for instance, made of synthetic rubber, is formed into a crooked band as most clearly seen in FIGS. 2 and 4, and connected at its one end, through the intermediary of a resilient metallic ring, with the top end of each pin 40 by means of a set screw 42, and at its opposite end, with a further supporting pin 43, having a reduced neck and a ball top end and studded on one of the radial arms of a flywheel 44.

The cover 12 is formed with a plurality of inspection openings 12a, through which an operator can inspect the flywheel and the like, from the outside, and with a central boss 12b slightly extending downwards and at the same time considerably projecting upwards from the cover web.

A capstan shaft 50 is formed with square or hexagonally arranged flat surfaces 50a, when seen from the top, only one of which is seen in FIG. 1, for engaging with a turning tool such as a wrench, and with a reduced shaft end 50b for engaging through the intermediary of a magnetic tape 63 with a detachable and freely rotatable pressure roll 62 of a tape recorder so as to feed the elongated tape continuously at a predetermined constant speed, as conventionally known to those skilled in the art. The shaft 50 is further formed with a peripheral groove 50c in which a spring clip 57 is detachably inserted and abuts through a nylon thrust ring 58 which is rotatably supported on a thrust and radial metal bearing 53, preferably of the porous and oilless nature and supported on the shouldered top end of boss 12b. 55 denotes an iron ring encircling the lower cylindrical part of the bearing 53 for increasing the strength of the latter and compensating thermal expansion and contraction thereof, in comparison with those of the light alloy constituting the cover 12. A similar metal bearing 52 is fitted in an oppositely and separatedly arranged relation to and from the former bearing 53 onto a shoulder formed at the lower part of the bore cut through the boss 12b, and backed up equally by an iron ring 54 press-fit onto the cylindrical part of the latter bearing 52. The provision of the latter serves effectively to receive the thrust force when the tape recorder with the motor should be inverted in its space position, as would be encountered during transportation.

Formed in the enlarged lower portion of the bore of boss 12b, there is a further peripheral groove for the reception of a spring clip 51 which serves, in cooperation with the tapered boss 46 formed at the center of the flywheel 44, for preventing the latter from being shifted in the lateral direction considerably to an off-centered position when the capstan shaft 50 has been drawn out from the motor for re-grinding the shaft or other cause and the motor is inclined considerably by some or other cause, thereby assuring a re-engagement of the capstan shaft for driving connection with the flywheel through the intermediary of a driving disc 48 which is in threaded connection with the male-threaded lower end of the shaft 50, on the one hand, and in pin-and-recess connection with the flywheel, as will be later described more in detail. In the bore of boss 12b, there is provided a mass of fibrous and absorbing material such as wound felt sheet 56 between the upper and lower bearings 53 and 52, for keeping therein a quantity of lubricant. Cap 59 covers the upper end of boss 12b and a substantial part of the upper surface of upper thrust bearing 53. Driver disc 48 is formed with a pair of projecting pins 48a, see especially FIG. 4, which project with considerable plays and through the intermediary of a perforated nylon disc 49, into corresponding recesses 61. As seen especially clearly from FIG. 4, the disc 48 is formed with a threaded bore 48b which is kept in meshing relation with the male-threaded lower end of shaft 50, as clearly seen from FIG. 1 and already referred to hereinbefore. A bored nylon cap 46b is slid on to the top end of boss 46 for easy insertion of the lower end of the capstan shaft 50 in the position shown herein.

A spring clip 47 is detachably received by a corresponding peripheral groove 46a formed in the enlarged lower bore part of the boss 46, thus serving to prevent the disc 48 from unintentional dropping out of the bore, upon withdrawing the capstan shaft 50 as was referred to.

The bore of boss 46 of the flywheel 44 is enlarged as at 46a and a correspondingly shaped upper projection 35a is formed on the web of the rotor 35. This provision will serve for positioning the driver disc 48 and flywheel 44 by engagement of the projection 35a snugly in the enlarged recess 46a for possible loss of alignment thereof with the rotor, upon withdrawing of the capstan shaft, which would prevent the latter from refitting.

The operation of the motor so far described is as follows:

When current, preferably of A.C., is fed from a power source through proper wiring, not shown, to the stator coil 20, the rotor shaft 33 begins to rotate. Unbalanced torque as may frequently be encountered at such starting instant, would otherwise be transmitted to the capstan shaft in a shocking manner, if these both should be directly coupled with each other, or united into one, as conventionally employed. In the embodiment shown, the outside type rotor will absorb the possible unbalanced torque partially on account of its larger flywheel effect and the remaining dynamic unbalance will be effectively absorbed by the resilient mechanical connection between rotor 35 and flywheel 44 by means of resilient strips 41. The mass of the flywheel 44 will also serve to absorb such torque as above referred to. These three balancing means combined will substantially perfectly absorb the possible unbalanced torque which is the largest at the starting moment of the motor, yet may develop during continuous running of the motor.

Before running of the motor, a quantity of lubricant is supplied to the recessed end ring space formed within the oil receiver 31, as shown. Oil is also supplied to the ring space containing the oil absorbing mass 25 in a superfluous quantity. Thus, a considerable quantity of lubricating oil is always available within the ring space between shaft 33 and sleeve 18, whereby assuring the thrust ball 28 to rotate substantially in an immersed condition in oil bath contained in the dished space formed by thrust member 16. Radial bearing metals may be also well lubricated by the oil constantly replenished by the absorbing fibrous mass 25.

When the motor is positioned upside down, for instance during transportation of the tape recorder, the oil contained in the pool within the receiver 31 will accumulate on the central area of the rotor web encircled by the cylindrical portion of the receiver, thus no danger of oil leakage from the inside space defined by the receiver may arise. In this inverted position of the motor, oil contained in the pool within the lower thrust bearing will flow through the final clearance between bearing metal 24 and rotor shaft 33 into the ring space containing the fibrous mass 25.

When the motor recovers its regular position shown in FIG. 1, a substantial part of the oil accumulated on the limited central area on the rotor web will flow back again into the oil receiving space in the receiver 31 along the inside wall surface thereof. Only a part of the oil will flow through the clearance between nylon cap 30 and shaft 33, and then through a fine cylindrical gap between upper bearing metal 23 and shaft 33, into the oil-containing chamber filled with fibrous material 25. Thus, the above-mentioned positioning of the motor will invite no cause of oil leakage from the oil pools into the stator-containing space formed within the outside rotor, although this space is kept in pneumatic communication with the oil storage space.

As seen especially from FIG. 1, the stator assembly comprising core laminates 19 and stator coil 20 is contained in a substantially closed space defined by the rotor 35 and mounting piece 13 so that it is liable to be subject to over-heating on account of its inefficient air-cooling.

Provision of conventional upper air-cooling vanes 37 will provide practically no effective remedy in this respect. The present motor is provided therefore, with the lower peripheral series of vanes 38 so as to constitute in effect a further air-cooling fan integrally formed with the rotor 35, the lower projecting end of coil 20 is thereby cooled during running of the motor and accumulated heat in other parts of the coil as well as the whole mass of stator laminates 19 will flow to such oil end and be carried away by heavy and strong air flows dissipated by the additional vanes 38 through outlet openings 60 formed through the wall of motor housing 10.

I claim:
1. In an electric motor for tape recording and playback machine comprising in combination:
   (1) a housing having substantially a cup shape,
   (2) a cover having a boss at its central region and detachably attached to said housing for closing the upper open end of said housing,
   (3) a stationary sleeve mounted on the bottom wall of said housing substantially at right angles to said wall,
   (4) a stator assembly mounted on said sleeve,
   (5) a rotor shaft rotatably supported within said sleeve, said shaft having an end projecting from the free end of said sleeve,
   (6) an inverted cup-shaped rotor fixedly mounted on said projecting end of said shaft,
   (7) a capstan shaft rotatably supported on the boss of said cover and extending substantially coaxially with said first shaft into the interior of said housing,
   (8) a flywheel detachably suspended from said capstan shaft and for rotating in unison therewith, and
   (9) a plurality of resilient coupling means joining said rotor and said flywheel.

2. Electric motor as set forth in claim 1, further comprising a pair of plastic caps frictionally kept in position on the projecting ends of the stator of said stator assembly.

3. Electric motor as set forth in claim 1, further comprising air-cooling fan wheels integrally formed on both ends of said rotor.

4. Electric motor as set forth in claim 1, wherein said resilient coupling means comprises a driver disc kept in threaded engagement with said capstan shaft and in pin-and-recess connection with said flywheel.

5. Electric motor as set forth in claim 1, further comprising an oil receiver having substantially a hollow cylinder provided with an inwardly opening free end, the opposite end of said cylinder being tightly attached to the bottom surface of the web of said rotor at its central region.

6. Electric motor as set forth in claim 1, further comprising a pair of oppositely arranged thrust and radial bearing metals mounted stationarily in a bore cut through the boss of said cover and rotatably supporting said capstan shaft, said metals adapted to receive axial thrust of the latter in both longitudinal directions thereof.

References Cited
UNITED STATES PATENTS

| | | | |
|---|---|---|---|
| 1,161,575 | 11/1915 | Aichele | 310—74 |
| 2,346,432 | 4/1944 | Heintz | 310—74 |
| 2,829,287 | 4/1958 | Font | 310—67 |
| 3,112,818 | 12/1963 | Woolley | 310—41 |
| 3,175,110 | 3/1965 | Kohlhagen | 310—164 |
| 3,226,579 | 12/1965 | Bygdnes | 310—74 |

MILTON O. HIRSHFIELD, *Primary Examiner.*

L. L. SMITH, *Assistant Examiner.*